INVENTOR
THOMAS C. BOUR

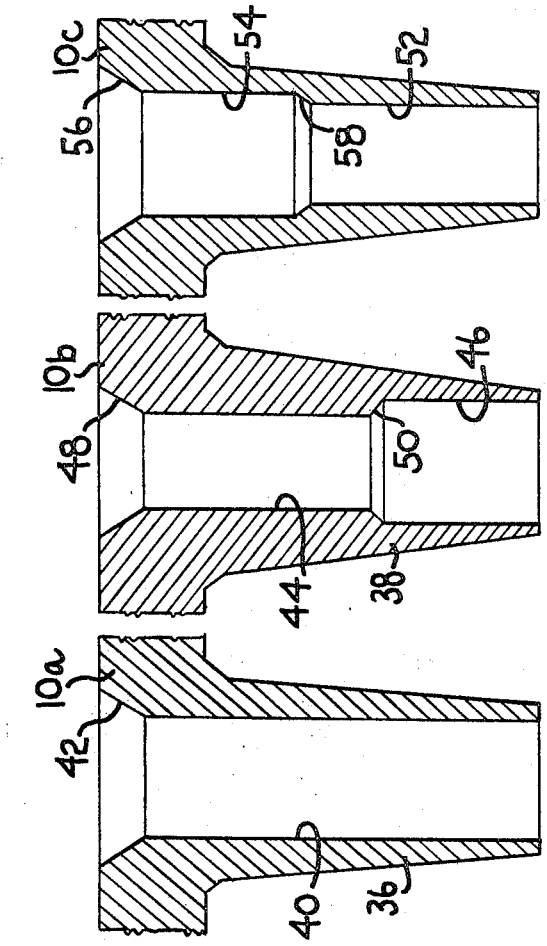
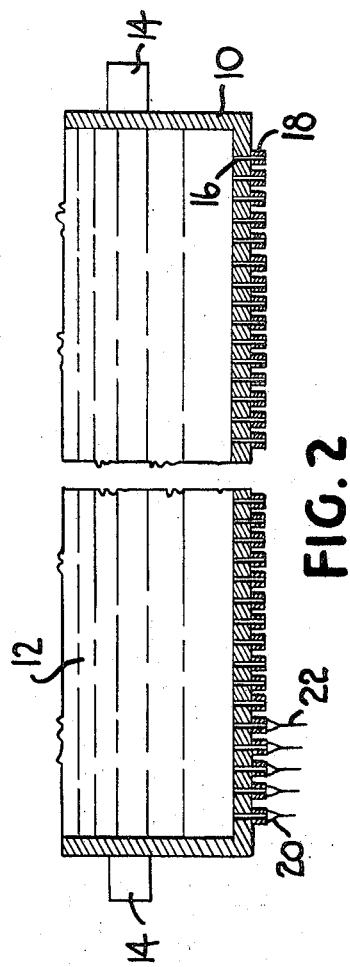
INVENTOR
THOMAS C. BOUR
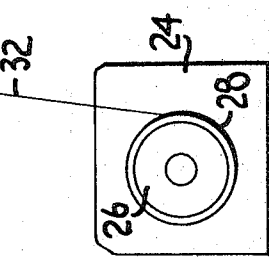
ATTORNEYS

United States Patent Office 3,526,487
Patented Sept. 1, 1970

3,526,487
APPARATUS FOR PRODUCING FIBER GLASS
Thomas C. Bour, Allison Park, Pa., assignor to PPG Industries Inc., Pittsburgh, Pa., a corporation of Pennsylvania
Filed Mar. 1, 1967, Ser. No. 619,704
Int. Cl. C03b *37/08*
U.S. Cl. 65—1                                    1 Claim

ABSTRACT OF THE DISCLOSURE

A fiber glass bushing tip is counterbored at its uppermost or inlet end.

BACKGROUND OF THE INVENTION

In the manufacture of fiber glass, either as continuous filaments which are gathered into a strand or as blown fibers where primary fibers are heated by a hot blast of gas and attenuated thereby, the fibers are formed by flowing through tips which are connected to orifices in the bottom of a trough-like bushing. The bushing is generally of platinum or platinum-rhodium alloy and is electrically heated, so as to maintain glass therein in a fluid state.

The glass flows through the tips and forms cones from which the fibers are formed.

Generally, bushing tips are formed by welding small rods to the bushing orifices and then boring openings or metering orifices therethrough for the passage of glass. The prior art shows bushing tips having uniform diameter bores or metering orifices and those counterbored at the delivery end. In each case, the inlet end is chamfered to present a smooth wall converging in the direction of glass flow. Examples of such bushing tips can be found in U.S. Pats. Nos. 2,323,000 and 3,066,504, respectively.

Bushing tips are generally 0.100 to 0.200 inch in length with a base (at the bushing) of about 0.080 inch to 0.100 inch outside diameter and a terminal outside diameter of about 0.060 inch to 0.120 inch. They are usually spaced on 0.080 inch to 0.140 inch centers. The terminal or tip wall thickness is usually about 0.005 inch to 0.015 inch.

SUMMARY OF THE INVENTION

According to this invention, the bushing tip is counterbored near its glass inlet end. The tip possesses the usual chamfer, the counterbored portion joining a uniform diameter metering portion by another chamfer converging in the direction of glass flow.

To properly evaluate the concept of this invention, the tip must be compared with prior art tips as previously described. For equal delivery rates, i.e., an equal quantity of glass flowing from each of the three bushing tip configurations and for equal tip lengths, comparing the two prior art types and that of the present invention, the delivery end bore of the tip of this invention is less than that of the two, described prior art types. The second of the prior art types with the counterbored delivery end has the largest diameter end bore.

Assuming the same wall thickness at the delivery end of each tip, the outside diameter of the delivery tip of the present invention is the smallest of the three tips for equal delivery rates. Thus, using the tip configuration of this invention, the spacing of tips of a bushing can be less than before, permitting more tips per bushing and thus more filaments to be formed from a single bushing of similar size than before.

The smaller exit diameter of the tip of the present invention also reduces the chances of flooding, i.e., the coalescing of glass between adjacent tips, even though the tips of the present invention may be more closely spaced. Susceptibility to flooding is reduced with faster bead drop time. Thus, during periods when fibers are not being drawn, as during periods when forming packages are being changed on the winder, molten glass continues to flow through the tips. This glass forms beads or drops which adhere to the tip exit until sufficient weight is achieved to overcome the adhering forces of viscosity and the surface tension inherent with the tip-glass interface. Both of these forces decrease with decreasing tip diameter. Thus, for equal flow rates and equal wall thicknesses at the tip exits, beads will drop faster from the smaller diameter tip of this invention.

BRIEF DESCRIPTION OF DRAWINGS

FIG. 1 is an elevational view showing a conventional fiber glass strand producing arrangement;

FIG. 2 is an enlarged sectional view of a fiber glass producing bushing; and

FIGS. 3 and 4 are enlarged sectional views of prior art bushing tips labeled as prior art;

FIG. 5 is an enlarged sectional view of the bushing tip of this invention;

DESCRIPTION OF THE PREFERRED EMBODIMENT

Figure 6:
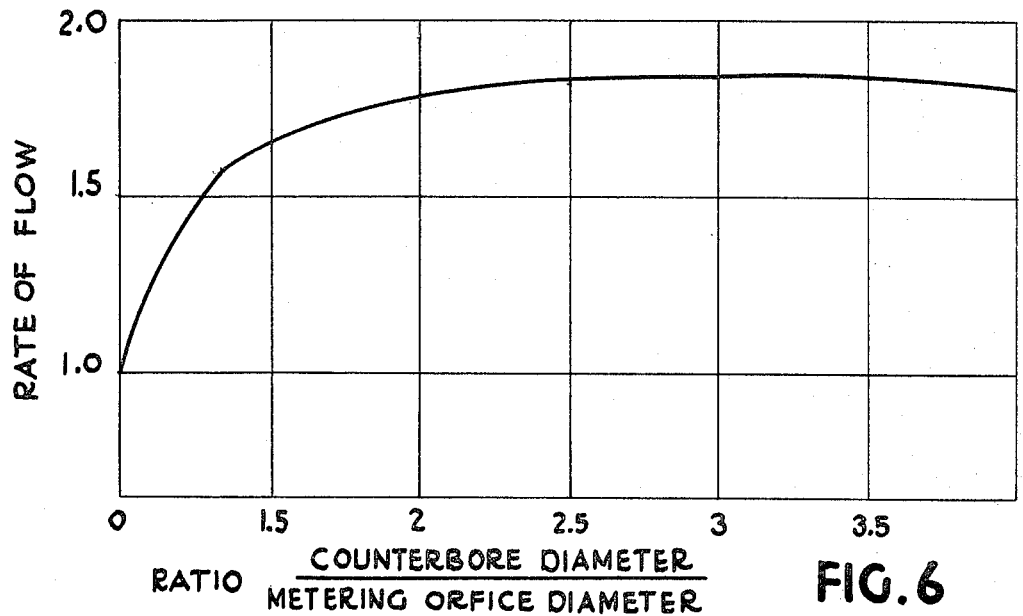
FIG. 6 is a graph having delivery rate plotted against the ratio of counterbore diameter to metering orifice diameter.

In FIGS. 1 and 2 there is shown a conventional fiber forming apparatus for producing continuous glass fibers in which the present invention is usable and finds its greatest advantage. There is shown a bushing 10 having a body 12 of molten glass therein which is maintained at proper temperature by being electrically heated. Bus bars 14 are connected to the bushing and to a source of electrical energy for heating the bushing and the glass therein. Glass flows through orifices 16 and tips 18, which are each spaced from adjacent tips and exposed to the adjacent atmosphere, to form cones 20 (best shown in FIG. 2) from which filaments 22 are drawn. The drawing force is derived from a winder 24 having a spindle 26 on which a forming package 28 is collected. The filaments pass over a binder applicator 30 and are grouped into a strand 32 by a gathering shoe 34 prior to being collected as the package 28. This arrangement is conventional and requires no further description.

FIGS. 3 and 4 illustrate conventional bushing tips 36 and 38. In FIG. 3, the tip 36 extends from a bushing 10a and is uniformly bored to form a metering orifice 40. For smooth delivery of glass, the tip 36 is chamfered or beveled as at 42. In FIG. 4, the tip 38 is bored to form a metering orifice 44 near the bushing 10b and counterbored at its delivery end, as at 46. The diameter of the counterbore or delivery orifice 46 is greater than the metering orifice 44. Here, as in FIG. 3, the tip is chamfered or beveled as at 48 and 50 for smooth delivery of the glass.

The tip constructed according to this invention is shown in FIG. 5 and is bored to form a metering orifice 52 at its delivery end, and counterbored, as at 54 to a larger diameter at its inlet end nearer the bushing 10c. Chamfered or beveled surfaces 56 and 58 join the counterbore to the bushing and the counterbore to the bore.

In FIG. 6, it can be seen that for a tip constructed according to this invention and with the counterbore and the orifice of the same length or depth, the rate of flow therethrough rises as the ratio of counterbore diameter to orifice diameter increases to a value of about 2 and then substantially levels off as the ratio increases.

Figure 7:
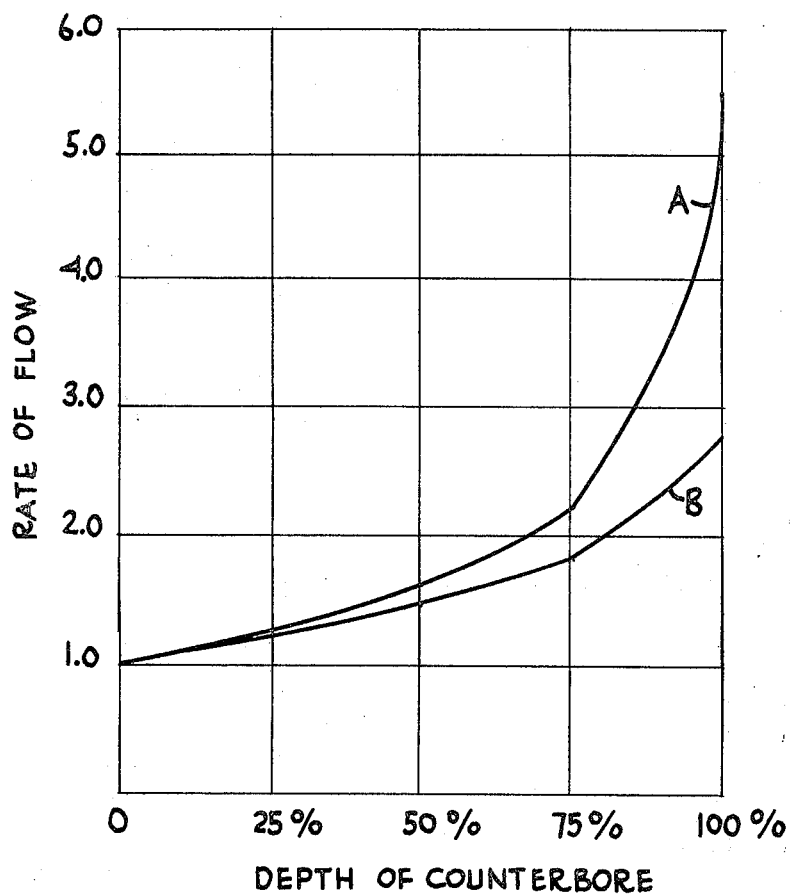
FIG. 7 is a graph showing the quantity of flow plotted against the depth of the counterbore.

In FIG. 7, there are comparisons of two tips constructed according to this invention. Here the rate of flow is plotted against depth of the counterbore and it can be seen that as the depth of the counterbore increases, the rate of flow increases. The upper curve A is plotted for a tip having a larger counterbore to metering orifice ratio than the lower curve B. It can thus be seen that the rate of flow for tips having the largest ratio of counterbore diameter to orifice diameter increases more rapidly than that with the smallest ratio. However, in any case, the rate of flow through a tip constructed according to the invention is greater than that for a tip of the prior art type having like exit end orifice diameters.

In actual operation, a bushing was constructed with 800 tips of the present invention and its performance was compared with a bushing having 800 tips constructed with a uniform bore. The spacing of the tips was the same; the outside diameter of the exit ends of the tip was the same; the diameter of the metering orifice of the prior art tip was 0.047 inch while the diameter of the metering orifice of the tip constructed according to this invention with the entrance end counterbored was 0.042 inch. The prior art tip delivered sufficient glass to make a particular strand at 10,200 ft./min., while the tip of the invention delivered sufficient glass to make the same type strand at 11,900 ft./min. In other words, the tip of this invention delivered 16.8% more glass than that delivered by the prior art tip.

Having the same inside exit end diameters, that is, 0.042 inch, the prior art tip delivers 34% less glass than the tip of this invention.

To further compare the performance of the various tips, fibers were produced at a drawing rate of 13,000 ft./min. A FIG. 3 tip with a metering orifice diameter of 0.052 inch spaced on 0.120 inch centers, and a FIG. 4 tip with a metering orifice of 0.042 inch and an exit end inner diameter or counterbore of 0.070 inch but on 0.140 inch centers were operated to produce the fibers at the same rate of flow and efficiency. It can readily be deduced that using the tip according to this invention, the spacing of the tips can be reduced for the same flow rate and the tip exit can be smaller in diameter.

For a specified flow rate of glass, minimum exit diameter and minimum tip spacing can be achieved with the present invention by maximizing the ratio of counterbore to metering orifice diameter, and by counterboring the tip to the largest possible depth commensurate with strength. In other words, the tip should be counterbored in such a manner that the wall thickness is not less than the wall thickness of the delivery end thereof, which is usually not less than a minimum of 0.005 inch.

I claim:

1. In an apparatus for producing glass fibers which includes a bushing adapted to contain molten glass, said bushing having a bottom and orifices therethrough with hollow tips attached thereto and extending therefrom, into which tips molten glass overlying the bottom of said bushing and said orifices therein flows through said orifices and enters at the entrance end from the bushing, flows and exits from the exit end of said hollow tip to be drawn as fibers, the improvement which comprises:

a uniform diameter counterbore at the entrance end of each tip and a smaller, uniform diameter metering bore, said counterbore joining said bushing at one end and said metering bore at the other end, said metering bore terminating at the exit end of said hollow tips, said hollow tips each being spaced from adjacent tips and exposed to the adjacent atmosphere, and having its exit end located at a point below and spaced from the bottom said bushing.

the ratio of said counterbore diameter to said metering bore diameter being greater than 1.0 and less than 2.0.

References Cited

UNITED STATES PATENTS

| | | | |
|---|---|---|---|
| 3,248,190 | 4/1966 | Woodward et al. | 65—1 |
| 3,294,503 | 12/1966 | Machlan et al. | 65—1 |
| 3,397,426 | 8/1968 | Yoshimasa et al. | |

FOREIGN PATENTS 969,905   9/1964   Great Britain.

S. LEON BASHORE, Primary Examiner

R. L. LINDSAY, JR., Assistant Examiner

U.S. Cl. X.R.

65—11